United States Patent [19]
DiPietro

[11] 3,781,103
[45] Dec. 25, 1973

[54] SLIDE TRAY
[75] Inventor: Matthew DiPietro, Webster, N.Y.
[73] Assignee: Eastman Kokak Company, Rochester, N.Y.
[22] Filed: Jan. 14, 1972
[21] Appl. No.: 217,763

[52] U.S. Cl. ............................... 353/111, 353/117
[51] Int. Cl. .......................................... G03b 23/06
[58] Field of Search.................... 353/107, 111, 117; 40/79

[56] References Cited
UNITED STATES PATENTS

| | | | |
|---|---|---|---|
| 3,276,156 | 10/1966 | Robinson | 40/79 |
| 3,386,195 | 6/1968 | Pester | 40/79 |
| 3,554,639 | 1/1971 | Robinson | 353/117 |

Primary Examiner—Louis R. Prince
Assistant Examiner—A. J. Mirabito
Attorney—W. H. J. Kline et al.

[57] ABSTRACT

A slide tray and projector in which the tray has a circular compartmented body member for receiving slides and a slide retaining member or disc carried by and rotatable relative to the body member. When the slide tray is mounted on a projector, the slide retaining disc is held in a fixed position relative to the projector with an opening in the retaining disc aligned with the projector's slide projection gate. A plurality of pins on the body member are engageable by a rib on the projector for indexing the body member in forward and reverse directions. The pins are also engageable by a tray locking projection on the projector to precisely locate selected slide compartments in registry with both the opening in the retaining disc and the slide projection gate. A detent mechanism is provided for preventing rotation of the body member from a predetermined position relative to the retaining disc, and the detent mechanism is disengaged by a lever connected to the tray locking projection during the first operation of the indexing mechanism to permit movement of the body member relative to the retaining disc. In any other position of the body member relative to the retaining disc, the detent mechanism is ineffective to prevent rotation between the body member and the disc.

1 Claim, 4 Drawing Figures

PATENTED DEC 25 1973 3,781,103

SLIDE TRAY

BACKGROUND OF THE INVENTION

1. Field of the Invention

The present invention relates generally to rotary slide trays for slide projectors.

2. Description of the Prior Art

Slide projectors for receiving rotary slide trays and having slide tray indexing means on the projector and tray for indexing a received tray in forward and reverse directions for successively projecting the slides contained therein are generally well known in the art. One of the many well known slide projectors of this general type that is presently commercially available on the market is the Carousel Slide Projector, in which Carousel is a registered trademark of the Eastman Kodak Company. One model of this slide projector is disclosed in U.S. Pat. No. 3,276,314. A circular slide tray for use with a slide projector of this type is disclosed in U.S. Pat. No. 3,276,156, and an indexing means for indexing the slide tray is disclosed in U.S. Pat. No. Re. 26,789, the disclosure of which is specifically incorporated herein by reference. The slide tray disclosed in U.S. Pat. No. 3,276,156 includes a circular, compartmented body member for receiving slides and a slide retaining disc carried by and rotatable relative to the body member. The retaining disc has a slide slot which is in register with the slide projection gate of the projector when the slide tray is mounted on the projector in its storage mode. When the tray is not on a projector, a detent mechanism releasably holds the body member and disc together in the slide storing mode, in which one slide compartment having a bridge across one end thereof for preventing the entry of a slide into the slide compartment from the other end is in register with the slide exit slot. When the exit slot of the disc is not aligned with the bridged slide compartment of the body member, the detent mechanism is ineffective to prevent relative rotation between the two portions. When such a slide tray is mounted on a projector, a cam surface on the projector engages and disables the detent mechanism so that the projector's indexing mechanism may move the body member to align other slide compartments with the exit slot and the projection gate.

While trays of the type described in U.S. Pat. No. 3,276,156 are usually highly reliable and have proven to be very successful in operation, it has been found that in some instances when such a slide tray is placed on a projector, the detent mechanism is not entirely disengaged, and the projector will not function properly. Such occurrences happen because the detent mechanism is disengaged by the downward movement of the slide tray over a cam surface. Since the weight of the slide tray, particularly when only partially loaded with slides, is sometimes insufficient to move the tray onto the cam surface, it has been found that in some instances it is necessary to manually push the tray onto the projector before the detent mechanism will release.

U.S. Pat. No. 3,554,639 discloses a slide tray for such projectors wherein a detent mechanism which holds the body member and retaining disc from relative movement is released by a mechanism in the projector during each indexing operation of the projector rather than when the tray is loaded onto the projector. As such, that tray is not susceptible to malfunction as described above with respect to the tray disclosed in U.S. Pat. No. 3,276,156. However, the detent mechanism is operative to prevent rotation between the body member and retaining disc regardless of their relative positions. As such, the exit slot in the retaining disc cannot be aligned with the bridged body member compartment when the tray is removed from the projector except by manually disabling the detent mechanism while rotating the members relative to each other until the exit slot is visually aligned with the bridged compartment. This, of course, requires more manual dexterity and care than the same operation with the first described tray, and further increases the risk of misalignment of the body member and retaining disc, which would result in the dumping of a slide.

SUMMARY OF THE INVENTION

Accordingly, it is the object of the present invention to provide a slide tray wherein the tray has a relatively movable body member and retaining disc with a detent connection therebetween which may be used to easily return the slide tray to its storage mode while not experiencing the difficulties described with respect to the tray disclosed in U.S. Pat. No. 3,276,156.

In accordance with this object, a preferred embodiment of the slide tray of the present invention includes a body member having a plurality of slide compartments and a retaining member movably connected to the body member and defining an opening alignable with one of the compartments at a time for passage of a slide to and from that compartment. The retaining member is adapted to be mounted on a projector with its opening in alignment with the projector's gate. A detent mechanism is provided to prevent relative movement between the body member and the retaining member from a storage mode but is ineffective to prevent such relative movement when the slide tray is in other than its storage mode. The detent mechanism is disabled during operation of the projector's indexing mechanism to permit successive slide compartments in the body member to be aligned with the opening in the retaining member and the projection gate of the projector.

The invention, and its objects and advantages, will become more apparent in the detailed description of the preferred embodiment presented below.

BRIEF DESCRIPTION OF THE DRAWING

In the detailed description of the preferred embodiment of the invention presented below reference is made to the accompanying drawing, in which.

DESCRIPTION OF THE PREFERRED EMBODIMENT

Figure 1:
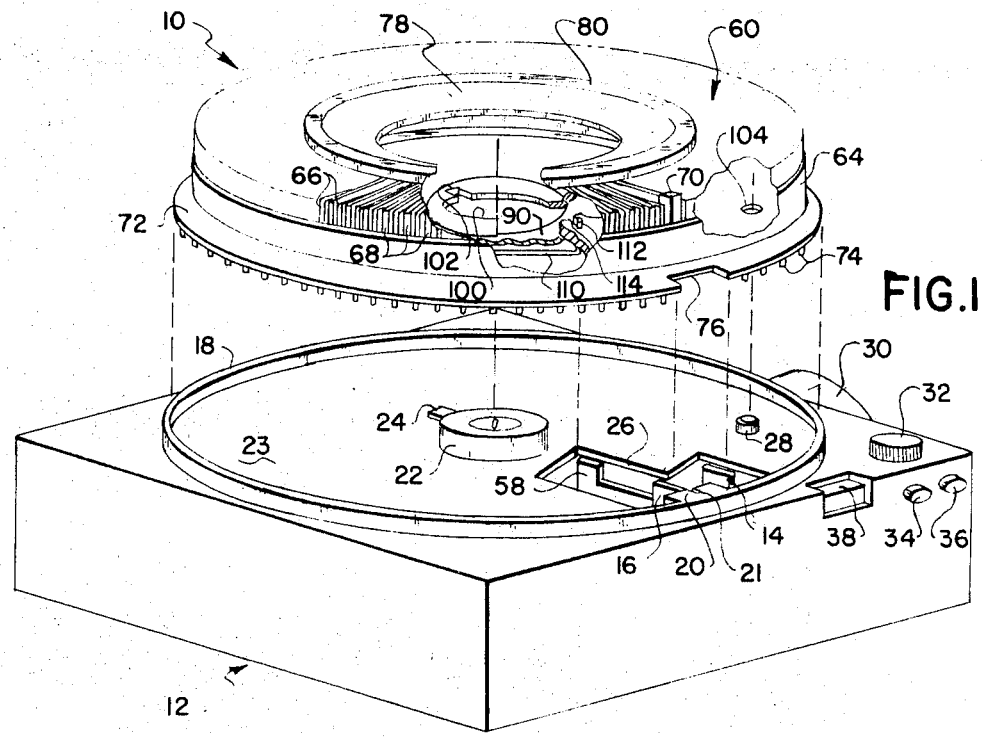
FIG. 1 is an exploded perspective view of a slide tray having a portion thereof broken away and of a slide projector for the slide tray.

The slide tray 10 of the present invention is particularly adaptable for use in slide projectors 12 of the general type disclosed in U.S. Pat. No. 3,276,314, in which indexing and locating means for the slide tray are of the general type disclosed in U.S. Pat. No. Re. 26,789. In general, slide projectors of the type referred to herein have a slide changing cycle including returning a slide, if any, from a slide projection gate to its tray compartment, indexing the slide tray one compartment by a movable rib 14, and permitting the next succeeding slide to be lowered into the projection gate. During the viewing of a slide, tray 10 is prevented from rotating by a locking projection 16. A more detailed description of an indexing and tray locking mechanism of this type appears in aforementioned U.S. Pat. No. Re. 26,789. The top of projector 12 has a circular rim 18 having a lip 20 carrying an index mark 21. The top of the projector further has a central spindle 22 projecting from a surface 23. Spindle 22 has an opening through which a spring biased spindle key 24 extends. An opening 26 in surface 23 is in register with the slide projection gate, not shown, and a pin 28 is provided for locating a slide tray. A lens assembly 30 is aligned with the projection gate and is focused by a knob 32. A pair of buttons 34 and 36 control forward and reverse operation of the slide indexing mechanism and a select button 38 is provided for withdrawing a tray locking projection 16 so that the slide carrying portion of the tray may be rotated on the projector.

Figure 2:
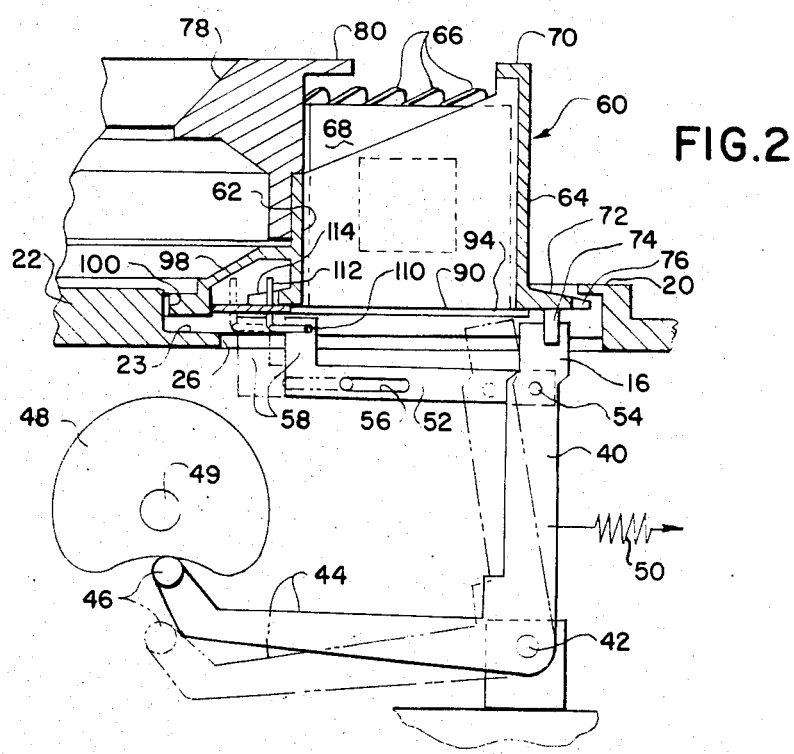
FIG. 2 is an elevational view in section of a portion of the slide tray and projector of FIG. 1.
Figure 3:
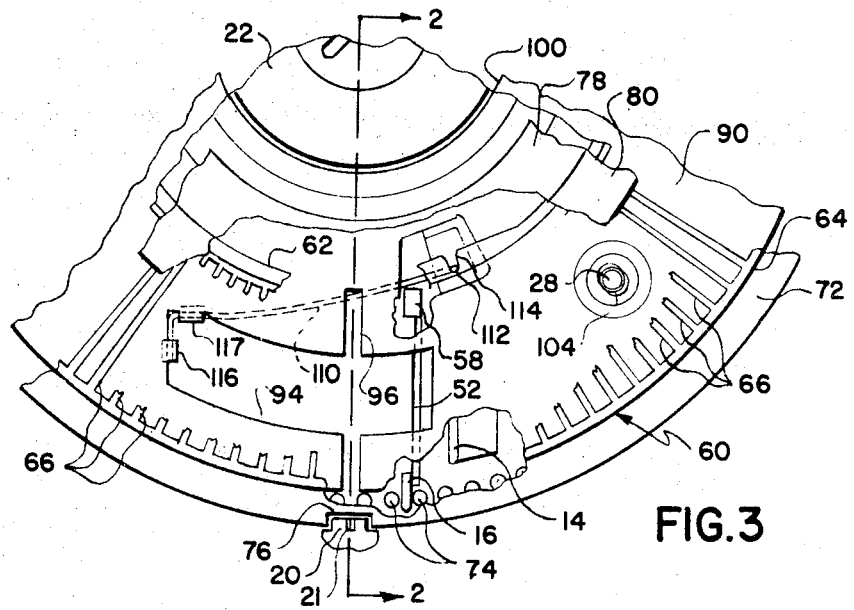
FIG. 3 is a top view of a portion of the slide tray and projector of FIG. 1 with a portion broken way.

Insofar as previously described, the slide projector shown is of a conventional type. Tray locking projection 16 forms a portion of a locking member which further includes a lever 40 of which the locking projection forms one end. Lever 40 is pivotally mounted to the projector housing by a stud 42 and includes an arm 44 having a cam follower 46 urged by a spring 50 into engagement with the cam surface of a single revolution cam 48. Cam 48 is mounted on a shaft 49. During the indexing cycle of the projector, the cam is rotated a single revolution to rotate lever 40 from its full line position in FIG. 2 to its phantom line position before rib 14 begins to move the tray and to return lever 40 to its full line position upon completion of the index cycle. When select button 38 is depressed, cam 48 rotates one-half revolution to rotate lever 40 to its phantom line position and to hold it there until the select button is released, whereupon the cam completes a full revolution. A detailed description of this operation and a mechanism for rotating cam 48 is found in U.S. Pat. No. 26,789.

The locking member further includes an arm 52 pivotally mounted to lever 40 at 54 and constrained to substantially linear movement by a pin-in-slot arrangement 56. A tab 58 on lever 52 extends upwardly past surface 23.

Slide tray 12 includes a body portion 60 having concentric inner and outer walls 62 and 64, respectively. Walls 62 and 64 are joined together by radially extending spacers or separator walls 66 to form a plurality of spaced compartments for receiving slide mounts 68. The slide compartment which is at register with the projection gate when tray 10 is mounted on projector 12 in a storage mode is not normally a slide holding compartment and has a bridge 70 extending thereacross to prevent the insertion of a slide therein from the top of body portion 60. All of the remaining compartments are slide storing compartments, and are open at each axial end of the body portion.

An annular lip 72 extends radially outwardly from the bottom of outer wall 64 and carries a plurality of depending pins 74 for cooperation with rib 14 for indexing body member 60 and with tray locking projection 16 to prevent rotation of the body member between indexing operations unless select button 38 is depressed. A notch 76 in lip 72 fits over lip 20 as the tray is lowered onto the projector. An annular lock ring 78 fits within the upper end of inner wall 62 and has a peripheral flange 80 which overlaps the slide compartments to prevent the slides from falling out if tray 10 is tipped upside down. Lock ring 80 is removable from body member 60 to permit slide editing or loading.

Figure 4:
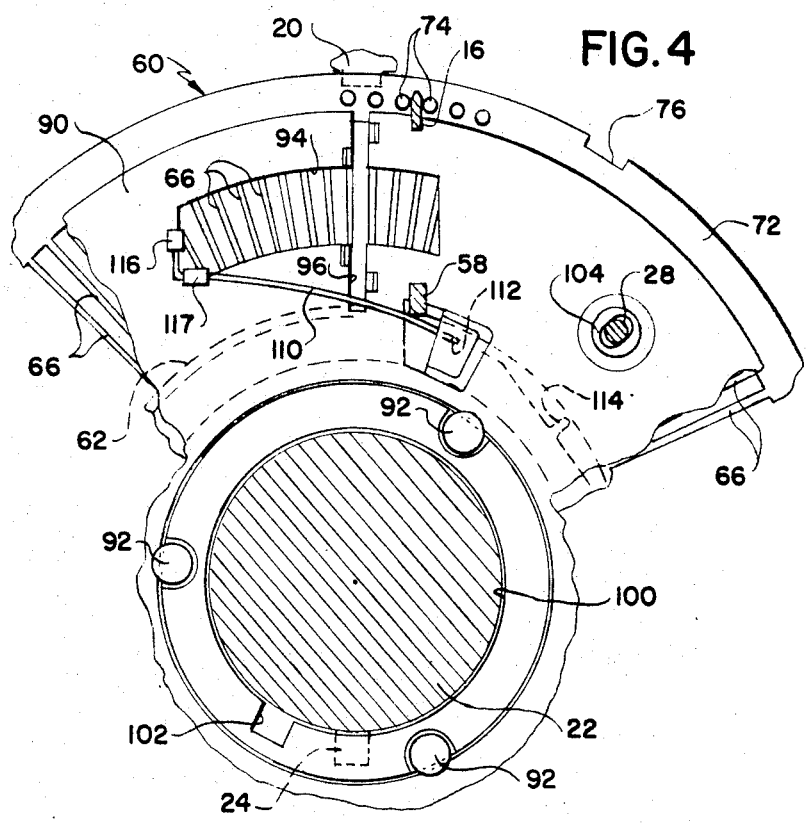
FIG. 4 is a bottom view of a portion of the slide tray and projector of FIG. 1.

A slide retaining member 90 in the form of an annular disc is mounted for rotation on the bottom of body portion 60 by three rivets 92 (FIG. 4) with the inner periphery of the disc abutting a circular wall 98 on the body member 60. Slide mounts 68 inserted in the slide tray compartments are supported on the annular disc.

Slide retaining member 90 has an opening 94 through which heated air expelled from the projector is directed. The heated air passes over those slides that are supported by retaining member 90 above opening 94 for preheating them when tray 10 is properly mounted on projector 12. The retaining member further has a radially extending notch 96 merging with and crossing opening 94 to form a slide passageway for uncovering slide compartments one at a time during relative movement of retaining disc 90 and body member 60, and through which slides 68 can be transported from tray 10 to the slide projection gate. When slide tray 10 is in a normal slide storing position, the slide compartment covered by bridge 70 is aligned with opening 96.

Body member 60 has a circular wall 98 with a central opening 100 having a notch 102 for receiving the corresponding spindle 22 and key 24 respectively, of projector 12. When slide tray 10 is initially placed on projector 12, spindle 24 extends through opening 100 and the tray is rotated until notches 76 and 102 align with lip 20 and key 24, respectively, and are received thereby, allowing tray 10 to drop into a loaded position. Retaining member 90 has an opening 104 adapted to receive pin 28 of the projector for fixedly positioning the retaining member with slide passageway 96 in register with the slide projection gate of projector 12. The retaining member remains fixed by virtue of pin 28 and opening 104, and body member 60 is indexed as a unit relative to retaining member 90 by rib 14 and the projector's slide indexing mechanism. Such indexing of body member 60 during operation of the projector successively brings the slide compartments and slides contained therein into register with slide passageway 96 and the projector's gate.

A detent mechanism is provided for holding body member 60 immovable relative to retaining member 90 when slide passageway 96 is in register with the compartment covered by bridge 70. The detent mechanism comprises a wire spring 110 having a bent end portion 112 that is movable into and out of a notch 114 formed along the inner surface of inner wall 62. The other end of wire spring 110 is attached to retaining member 90 by a pair of bent tabs 116 and 117 so that bent portion 112 is pressed against the inner surface of wall 62, and notch 114 is positioned on body member 60 so that when bent portion 112 of wire 110 is within the notch, the compartment covered by bridge 70 is aligned with slide passageway 96. When slide tray 10 is mounted on projector 12, spring wire 110 is positioned adjacent tab 58 on arm 52 so that movement of arm 52 to the left as viewed in FIG. 2 pushes bent portion 112 of the wire out of notch 114 to the phantom line position shown in FIG. 2. When tray 10 is initially mounted on projector 12 bent portion 112 is in notch 114. Upon the first cycling the indexing mechanism of projector 12, tab 58 engages wire 110 and withdraws bent portion 112 thereof from notch 114, releasing body member 60 for movement relative to retaining member 90. The body portion is then indexed one slide compartment by rib 14 and tray locking projection 16 is returned to its normal position between tabs 74 to prevent further rotation of the body member. Bent portion 112 is returned to the right as viewed in FIG. 2, but is no longer aligned with notch 114. The bent portion of the wire now rests on the smooth, inner surface of wall 62, and should the operator wish to remove the tray without returning the body and retaining members to their original, storage positions, he need only withdraw key 24 into spindle 22 in a known manner and lift the tray, sliding lip 72 from under lip 20. Once removed, the tray can be returned to its storage mode by inverting the tray to prevent slides from falling out and by rotating retaining member 90 releative to body member 60 until bent end portion 112 of wire spring 110 falls into notch 114. Thus, the tray parts can be returned to their storage condition rapidly.

The invention has been described in detail with particular reference to a preferred embodiment thereof, but it will be understood that variations and modifications can be effected within the spirit and scope of the invention.

I claim:

1. A slide tray for use with a slide projector having (1) a slide projection gate, (2) a locating member, (3) means for indexing a received slide tray, and (4) a locking member movable between first and second positions; said slide tray comprising:

a circular body member having (1) radially spaced, annular, inner and outer walls and (2) spaced, radial separator walls connecting said annular walls to define compartments for receiving slides;

a circular retaining disc rotatably connected to said body member and cooperating therewith to releasably hold slides in said compartments, said disc defining a radial opening alignment with one of said compartments at a time for passage of a slide to and from said one compartment;

means on said disc engageable by said locating member for preventing rotation of said disc relative to the projector;

a plurality of pins on said body member, said pins being alternately engageable by (1) the indexing means to rotate said body member to align successive compartments with said gate and (2) the locking member in its first position to prevent rotation of said body member; and detent means including (1) a radial notch on said body member and (2) a wire spring having a first portion fixed to said disc and a second portion spring urged for movement into said notch when said body member is in a single, predetermined angular alignment with said disc, said wire spring being engageable by said locking member during movement thereof from its first to its second position for moving said second portion out of said notch.

* * * * *